C. T. DICKEY.
TIRE SHOE AND METHOD OF CONSTRUCTING SAME.
APPLICATION FILED AUG. 10, 1912.
1,138,092.
Patented May 4, 1915.
2 SHEETS—SHEET 2.
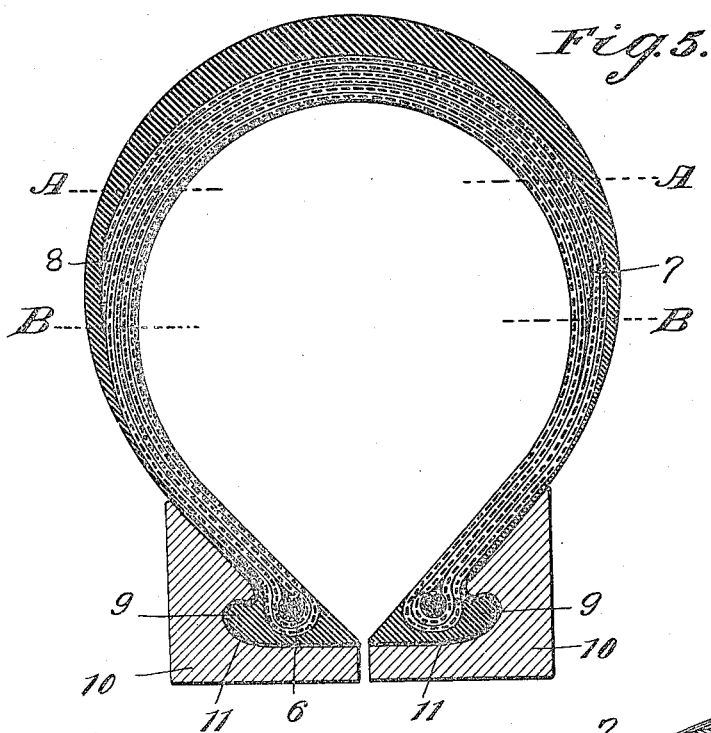
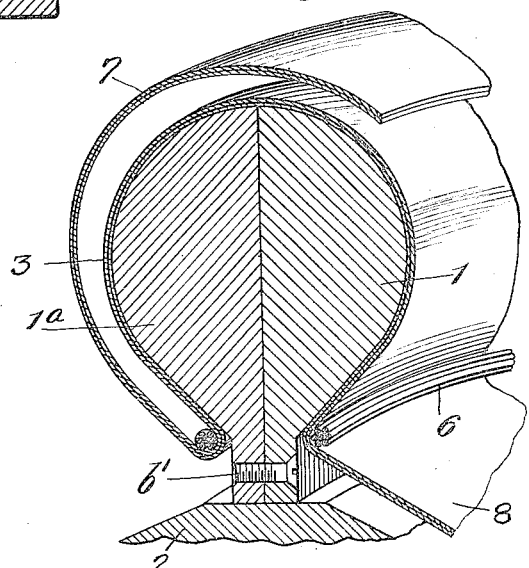
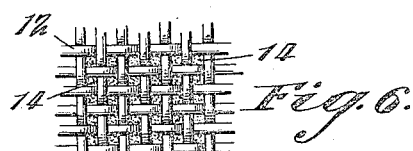
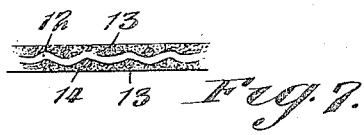
WITNESSES
Harry C. Hebig
Wm. C. Dunn
INVENTOR
Charles T. Dickey
BY
Clifford _____
his ATTORNEY

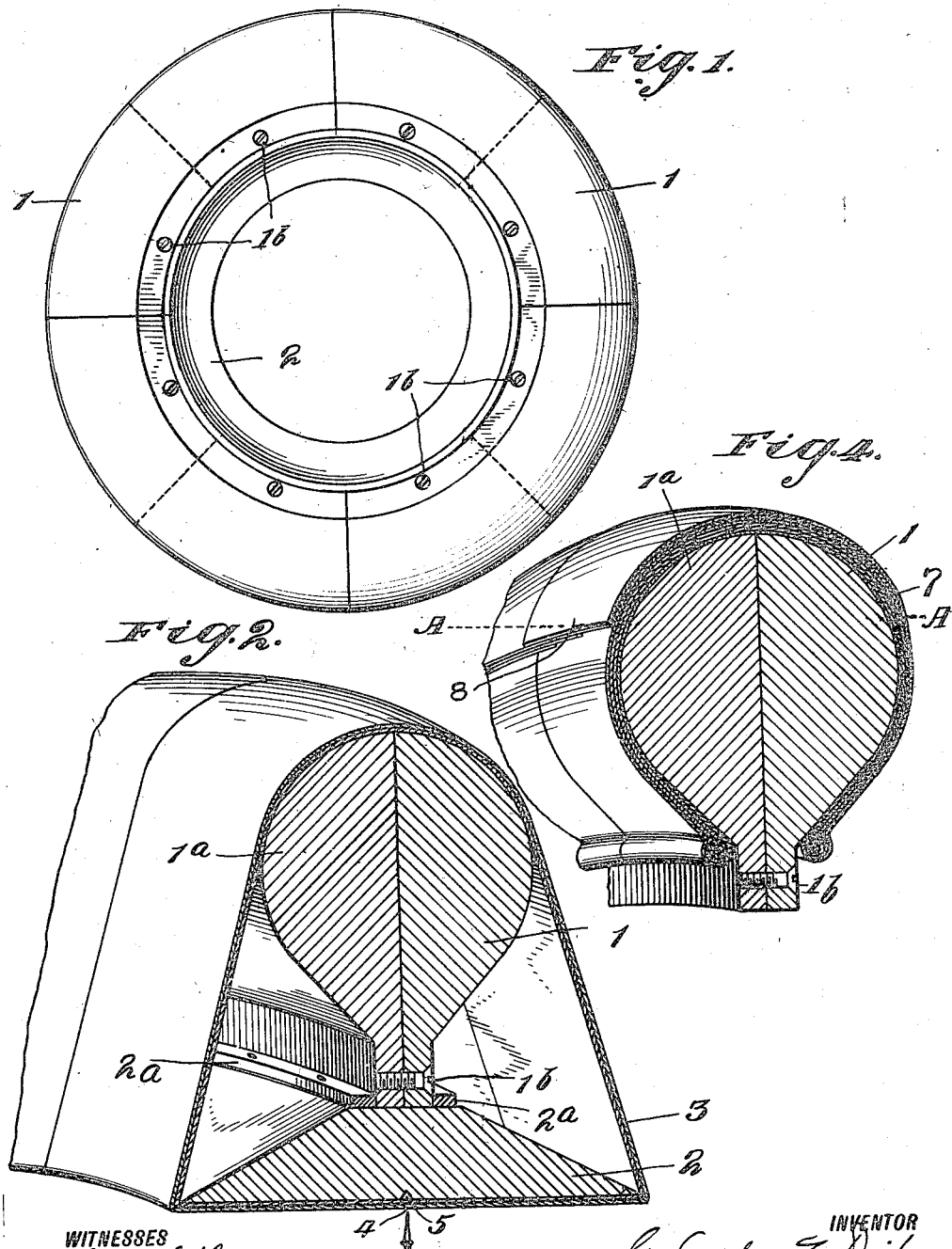

UNITED STATES PATENT OFFICE.

CHARLES T. DICKEY, OF ELIZABETH, NEW JERSEY, ASSIGNOR TO VOORHEES RUBBER MANUFACTURING COMPANY, OF JERSEY CITY, NEW JERSEY, A CORPORATION OF NEW JERSEY.

TIRE-SHOE AND METHOD OF CONSTRUCTING SAME.

1,138,092.

Specification of Letters Patent.

Patented May 4, 1915.

Application filed August 10, 1912. Serial No. 714,396.

*To all whom it may concern:*

Be it known that I, CHARLES T. DICKEY, a citizen of the United States, residing at Elizabeth, in the county of Union and State of New Jersey, have invented certain new and useful Improvements in Tire-Shoes and Methods of Constructing Same, of which the following, taken in connection with the accompanying sheets of drawing, forms a complete and concise description.

My present invention relates to a tire-shoe carcass as well as a completed tire shoe and to the method employed in its construction.

My invention comprehends the formation of a tire shoe of the wrapped type; that is, a shoe in which the friction fabric in the form of a strip is wound continuously around a suitable form or mandrel. In my improved tire and the method of its manufacture each convolution, in the winding, overlaps the preceding convolution until a complete annular tube is formed. The tube thus formed is circumferentially slitted around its inner periphery, thus leaving free end portions of each convolution of the material which are employed for reinforcing the tread-portion of the shoe. After the slitting operation the bead wires are inserted in place and each end of the strips thus formed, (which is of sufficient length to permit of its extending across the tread-portion of the tire) is reversed back upon itself to increase the ply of fabric of which the tire shoe is composed, and one free end overlaps the opposite free end to reinforce and still further increase the plies of fabric extending around the tread portion of the shoe. Thus I am enabled to produce a tire shoe which is economical in use of friction fabric and still obtain the maximum strength and durability at the tread-portion of the tire-shoe, which portion is subject to and must endure the greatest wear in service. It will be understood, of course, that this so-called friction fabric is a suitable cloth surfaced with vulcanizable rubber that is finally subjected to vulcanization in finishing the shoe.

A further object of my invention is to construct a tire shoe in such a manner as to secure yielding side walls, so that the bending action to which they are subjected when under load-carrying conditions will not cause them to crack or break, and to accomplish this I use a loosely-woven fabric instead of following the prevailing practice of using a close or finely-woven fabric, which produces a wall of considerable stiffness and which has a tendency to break down under distortion when in use.

Finally my invention comprehends the new and novel method of constructing the new form of tire just described.

In the accompanying drawings I have illustrated one preferable embodiment of my invention by way of example only, and as it may be possible to depart from or vary the structural details illustrated and described herein without departing from the broad features of the invention, I wish to be understood as not limiting myself to this illustrated and described embodiment, and therefore reserve to myself a fair range of equivalents as well as such latitude in matters of detail as may fairly come within the scope of my appended claims.

Referring to the accompanying drawings, Figure 1 illustrates the form of mandrel used in the manufacture of my improved tire shoe. Fig. 2 is a fragmentary perspective detail showing the first step in the wrapping or forming process. Fig. 3 is a similar illustration showing the second step in the process of manufacture, with the bead wires in place. Fig. 4 is a like view showing the carcass with its fabric portion completed. Fig. 5 illustrates the method of forming the completed clencher-bead. Figs. 6 and 7 are fragmentary exaggerated details illustrating the fabric weave, showing the interstices between the warp and weft threads filled with the vulcanizable rubber with which the fabric is also surfaced.

In detail, a forming mandrel comprised of suitable sections 1 and 1ª, is employed. These sections are provided with depending extensions which are suitably bolted together as at 1ᵇ. Detachably fastened to the inner peripheral portion of the annular mandrel formed by these sections, is a gage or measuring mandrel, the sections being indicated at 2. The mandrel forming sections 1 and 1ª and the mandrel 2, are joined or fastened together by suitable bands 2ª, or in any other suitable manner.

In forming the tire shoe a strip 3, of friction fabric is spirally wound around the mandrels 1 and 2, as shown in Fig. 2. In the winding each convolution is made to lap three or more of the preceding adjacent convolutions so as to form a plurality of superimposed plies or layers of fabric with but one single strip of material. This is done to reinforce and increase the wearing quality of the tire shoe. When the strip 3, has been wound completely around the annular mandrels and a complete tubular form of the friction material is produced, the material is slit, as at 4, circumferentially at its inner periphery midway of the width of the mandrel 2, the latter being grooved as at 5, as a guide for the knife or cutting instrument. The mandrel 2 is of such width as to provide the proper length to the several separate strips formed by the slitting operation, as will be presently understood.

Upon the completion of the slitting operation the strips are drawn inwardly and made to conform to the contour of the core or mandrel formed by the sections 1 and 1ª (see Fig. 3), and the clencher bead wires, which are annular in form and indicated at 6, are positioned as shown, after which one end of the strip, indicated at 7, is reversed upon the previous core-encircling portion of the strip and superimposed thereon. The opposite end of the strip is thereupon similarly reversed and drawn back upon the body of the strip and superimposed upon the opposite end 7, of the strip (see Fig. 4). With the form of winding described it will be apparent that a reinforced tread is obtained comprised of a maximum number of plies or layers with a minimum expenditure of friction material. That portion of the tire indicated at A—A (see Figs. 4 and 5), called the tread portion, which is subjected to the greatest wear and is most apt to puncture,—is, by my method, reinforced and greatly strengthened in a most economical and efficient manner. It will be understood that the friction fabric has, previous to the winding, been treated with a suitable rubber preparation or rubber-like compound so that the superimposed layers will adhere and, under vulcanization, produce an intimate, compact, homogeneous mass. Around the inner peripheral edges of the tire shoe thus formed, a clencher bead of unvulcanized rubber 9, is formed by suitable forming mandrels 10, and an adhesive restraining strip 11, is provided for the purpose of supporting and holding it in position, this restraining strip 11 merging into the tread portion of graduated thickness, which may be made of rubber or other suitable vulcanizable material after which the shoe thus formed is submitted to a process of vulcanization.

In résumé, as above described, my new and improved method of constructing tire shoes consists in winding a continuous single strip of friction material spirally around suitable forming mandrels—which operation, owing to the fact that one single strip is being handled, may be performed expeditiously and without requiring a great degree of accuracy—and then in slitting the fabric tube thus formed circumferentially around its inner periphery, forming a plurality of partially superimposed layers of short strips having free ends of sufficient length to partially again encircle the carcass, then positioning the bead rings, then reversing and turning each extremity of the strip back upon itself, one extremity of the strip overlapping the opposite extremity of the strip and being superimposed thereon, the ends or extremities of each strip extending over the tread-portion of the tire shoe to reinforce and strengthen this portion thereof.

Having thus described the general construction and method of winding the friction fabric in the production of my new and improved tire, I will now describe that feature of my invention which pertains to the flexibility of the side walls of the tire shoe, which feature is incident to the construction above described, inasmuch as the particular character of the friction fabric used in producing my tire shoe is inherent therein.

Referring to Fig. 5, the dotted line B—B indicates those points in the tire walls where the bending action is greatest, and the practice prevails in the manufacture of tire shoes of using every close and finely-woven fabric for the purpose of producing a strong and, as nearly as possible, impenetrable body of material. The closer the weave of the material, the greater the stiffness, and when a complete tire shoe embodying a number of superimposed layers of closely-woven tire fabric is completed, the side walls of the shoe are consequently very stiff and unyielding, the result being that when subjected to use—and particularly when the tire has not been sufficiently inflated—the walls are bent down under the pressure and weight of the vehicle, which causes the fabric to break, resulting in blowouts and destruction of the tire shoe. Aside from this, in a very closely-woven fabric, greater friction is created between the threads, which tends toward disintegrating, wearing, and weakening of the fabric walls.

According to one phase of my invention I employ a very coarsely-woven fabric such as I have illustrated in Figs. 6 and 7 (which are somewhat exaggerated to give a more clear explanation of the same). The longitudinal warp threads 12, as well as the lateral weft threads 13, are spaced, forming interstices 14, in which vulcanizable rubber, with which the fabric is surfaced, enters, and in this way the parallel strands of both warp and weft threads are separated from each other and are not in contact, as in the closely-woven fabrics now commonly used.

In my improved fabric the friction is minimized. With a tire wound with friction material incorporating in its structure a friction fabric woven in the manner I propose, side walls of a very yieldable character are provided, which have the characteristic of giving under stress or strain, without liability of cracking or breaking due to abrupt bending action, as is commonly experienced when a closely-woven fabric is employed.

Having thus described my invention, what I claim as new herein and desire to secure by Letters Patent is:

1. The herein-described method of forming tire-shoe carcasses consisting in spirally winding a single strip of friction fabric on an annular mandrel to form an endless tube, then slitting the annular tube around its inner periphery to form a plurality of short strips of sufficient length to permit the free ends of each strip to be reversed and turned back upon the body of the carcass and extend over the tread-portion thereof, then positioning the bead wires, and drawing the ends of each strip around the bead wires and initially-formed tube and overlapping the free ends of the strips on one side of the carcass with the opposite free ends of the strips.

2. The herein-described method of forming tire-shoe carcasses which consists in spirally winding a single strip of friction fabric around an annular mandrel to form an endless tube with each convolution of the winding strip overlapping a plurality of other convolutions, then slitting the tube thus formed around its inner periphery, then inserting bead rings, then drawing the ends of the short strips formed by the slitting on one side of the carcass around the bead ring on that side, reversing these ends back upon the initially-formed tube and extending them across the tread-portion of the carcass, then drawing the opposite ends of the strips around the other bead ring, reversing these ends of the strip and turning them back upon the initially-formed tube, and overlapping the opposite ends to reinforce the tread portion of the carcass.

3. As a new article of manufacture, an annular tire-shoe carcass comprising superimposed layers of friction fabric formed by a plurality of overlapping encircling strips of friction material, the ends of each strip being reversed back upon themselves, one end of each strip overlapping its opposite end and both ends extending across and reinforcing the tread-portion of the carcass.

4. The herein-described process of forming a tire shoe, which consists in spirally winding a continuous strip of fabric upon a mandrel, said fabric being treated with a vulcanizable friction giving material, to fill the interstices between the warp and the weft thereof and prevent contact between the strands of the material, then slitting the tube thus formed along its inner periphery, then positioning the bead rings, then drawing the free ends of the fabric on one side of the carcass around the contiguous beading and carrying them over the tread portion, then drawing the free ends of the strips on the opposite side of the carcass around the adjacent beading and carrying them over the tread portion, these latter strips overlapping the strips first manipulated, then providing a clencher bead of unvulcanized rubber, then applying a vulcanizable cover of graduated thickness merging into said clencher bead and submitting the whole to the process of vulcanization.

5. As a new article of manufacture, a tire shoe carcass provided with yieldable side walls formed of layers of loosely woven fabric made from a continuing strip of material divided and formed into a plurality of strips the ends being disposed at opposite extremities of the tread portion of the carcass and overlapping one another, forming a reinforced tread portion of a greater number of plies of the fabric than the side walls of the carcass.

In witness whereof I have hereunto set my hand in the presence of two subscribing witnesses.

CHARLES T. DICKEY.

Witnesses:
LOUISA E. SIMSON,
HENRIETTA E. WORKMAN.